(12) United States Patent
Natuzzi

(10) Patent No.: US 12,709,212 B2
(45) Date of Patent: Aug. 18, 2026

(54) CONVERTIBLE FURNITURE ARRANGEMENT FOR A RECREATIONAL VEHICLE

(71) Applicant: Triple E Canada, Ltd., Winkler (CA)

(72) Inventor: Angelo Natuzzi, Winkler (CA)

(73) Assignee: Triple E Canada, Ltd., Winkler (CA)

( * ) Notice: Subject to any disclaimer, the term of this patent is extended or adjusted under 35 U.S.C. 154(b) by 383 days.

(21) Appl. No.: 17/944,265

(22) Filed: Sep. 14, 2022

(65) Prior Publication Data

US 2024/0083334 A1 Mar. 14, 2024

(51) Int. Cl.

| | |
|---|---|
| ***B60N 2/24*** | (2006.01) |
| ***A47C 17/12*** | (2006.01) |
| ***B60N 2/02*** | (2006.01) |
| ***B60N 2/75*** | (2018.01) |
| ***B60N 3/00*** | (2006.01) |

(Continued)

(52) U.S. Cl.

CPC ................ *B60P 3/36* (2013.01); *A47C 17/12* (2013.01); *B60N 2/02* (2013.01); *B60N 2/24* (2013.01); *B60N 2/753* (2018.02); *B60N 3/001* (2013.01); *B60P 3/34* (2013.01)

(58) Field of Classification Search

CPC .......... B60N 2/753; B60N 2/24; A47C 7/425; A47C 17/12; A47C 7/68; A47B 2001/053; A47B 1/10; B60P 3/36; B60P 3/34

See application file for complete search history.

(56) References Cited

U.S. PATENT DOCUMENTS

| | | | | |
|---|---|---|---|---|
| 276,748 | A | 5/1883 | Baldwin | |
| 360,540 | A * | 4/1887 | Russack ................ | A47C 7/425 297/394 |

(Continued)

FOREIGN PATENT DOCUMENTS

| | | | | |
|---|---|---|---|---|
| CH | 134565 A | * 9/1928 | | |
| CN | 111920192 A | * 11/2020 | .............. | A47B 1/04 |

(Continued)

OTHER PUBLICATIONS

"Full Review | 2020 Tiffin Wayfarer 25RW | Class C RV With a Massive Slideout"; YouTube.com; https://www.youtube.com/watch?v=4tn2gGTB4L8; posted Jul. 4, 2019; visited Jun. 9, 2021.

*Primary Examiner* — Timothy J Brindley
(74) *Attorney, Agent, or Firm* — Faegre Drinker Biddle & Reath LLP

(57) ABSTRACT

A convertible furniture arrangement includes a seat assembly having a seat bottom and a seat back coupled to the seat bottom. The seat back includes a back frame and a back cushion movable relative to the back frame. An armrest assembly is coupled to the seat bottom. The armrest assembly includes a base armrest portion and a side armrest portion movable from a stowed configuration to an extended configuration relative to the base armrest portion. The convertible furniture arrangement is convertible from a first seating mode to a second seating mode. In the first seating mode, the side armrest portion is in the stowed configuration and the back cushion is positioned against the back frame. In the second seating mode, the side armrest portion is in the extended configuration and the back cushion is positioned against the side armrest portion.

22 Claims, 15 Drawing Sheets

(51) Int. Cl.
*B60P 3/34* (2006.01)
*B60P 3/36* (2006.01)

(56) References Cited

U.S. PATENT DOCUMENTS 583,136 A * 5/1897 Anderson .............. A47C 17/12 5/26.1
817,596 A 4/1906 Siebenthal
1,385,317 A 7/1921 Dyer
1,426,463 A 8/1922 Coopersmith
1,725,438 A 8/1929 Brand
1,768,520 A 6/1930 Anderson
2,452,642 A * 11/1948 Ewing .................... A47C 17/12 297/116
2,544,980 A 3/1951 Brown
2,777,742 A 1/1957 Schieber
3,133,510 A 5/1964 Maraventano
3,866,547 A 2/1975 Guyton
4,318,195 A 3/1982 Reppas
4,815,785 A 3/1989 Goodall et al.
4,862,611 A 9/1989 Wright
5,088,135 A * 2/1992 Violette .................... B60P 3/36 5/8
5,136,737 A 8/1992 Reppas et al.
5,197,776 A 3/1993 Brown
5,771,815 A * 6/1998 Leftwich ................ A47B 31/06 108/115
5,788,324 A 8/1998 Shea et al.
6,098,346 A 8/2000 Miller et al.
6,441,576 B1 8/2002 Marin-Martinod et al.
6,637,812 B2 * 10/2003 Laughlin ................ A47C 4/028 297/118
6,929,321 B1 8/2005 Shrock
7,399,031 B2 7/2008 Gardner
7,644,991 B2 * 1/2010 Davis ................... A47C 1/0308 297/411.36
7,896,432 B2 3/2011 Dunkel
8,424,132 B2 4/2013 Stimel
8,919,883 B2 * 12/2014 Hankins ................... A61G 5/12 297/411.32
9,174,556 B2 11/2015 Yin et al.
10,029,602 B1 7/2018 Spickler et al.
10,154,730 B2 12/2018 Natuzzi
10,513,205 B2 12/2019 Nasiri
10,611,282 B2 4/2020 Natuzzi
10,835,047 B2 11/2020 Dimitrov
RE48,344 E 12/2020 Weiland et al.
11,358,504 B2 6/2022 Natuzzi
11,426,128 B1 * 8/2022 Ruby ................... A61G 13/125
2004/0160074 A1 8/2004 Shea
2004/0239135 A1 12/2004 Mehrer
2010/0140010 A1 6/2010 Hollenbeck et al.
2010/0264791 A1 10/2010 Rajeswaran
2011/0023230 A1 2/2011 Colombo
2012/0131745 A1 5/2012 Wieland
2013/0119738 A1 5/2013 Wallis
2013/0241246 A1 9/2013 Round et al.
2013/0269574 A1 * 10/2013 Cooper ................ A47B 3/0815 108/69
2014/0246963 A1 9/2014 Elizondo et al.
2017/0197537 A1 7/2017 Gerzeny et al.
2018/0296001 A1 * 10/2018 Tucker ................... A47C 17/12
2019/0116974 A1 4/2019 Natuzzi
2020/0170415 A1 6/2020 Broussard et al.
2021/0031659 A1 2/2021 Natuzzi
2021/0037983 A1 2/2021 Marjadsingh
2021/0353072 A1 11/2021 Aldrich
2023/0200555 A1 * 6/2023 Caron .................. A47C 13/005 297/440.1

FOREIGN PATENT DOCUMENTS

DE 202007016820 U1 * 4/2008 ........... A47C 20/027
DE 102015100407 A1 * 7/2016
DE 202015106679 U1 * 2/2017
DE 102020206224 A1 * 11/2021 ............. B60N 2/753
FR 2655253 A1 * 6/1991
FR 3096620 A1 * 12/2020 ............. B60N 2/753
FR 3148186 A1 * 11/2024 ............... A47B 1/04
KR 101049933 B1 * 7/2011
KR 20200032948 A * 3/2020
WO WO-2016128911 A1 * 8/2016 ............. A47C 17/12

* cited by examiner 100
17
128
180
174
114
17
172

128
114
174
186
182
184
178
180
172
179

CONVERTIBLE FURNITURE ARRANGEMENT FOR A RECREATIONAL VEHICLE

TECHNICAL FIELD OF THE DISCLOSURE

The present disclosure relates to a convertible furniture arrangement for a living quarters, such as a recreational vehicle. More specifically, the present disclosure relates to a convertible seating, dining, and sleeping arrangement for a slide-out room of a recreational vehicle.

BACKGROUND OF THE DISCLOSURE

In confined living quarters, such as recreational vehicles, space is limited and at a premium. Accordingly, it is desirable if structures can be rearranged to facilitate more than one activity. For example, it has been known to provide dinette arrangements which may be convertible to provide other types of seating arrangements. Further improvements would greatly enhance the usefulness of such convertible furniture arrangements in confined living quarters.

SUMMARY

In an exemplary embodiment of the present disclosure, a convertible furniture arrangement for a living quarters is provided. The living quarters includes a wall and a floor. The convertible furniture arrangement includes a seat assembly having a seat bottom and a seat back coupled to the seat bottom. The seat back includes a back frame and a back cushion movable relative to the back frame. An armrest assembly is coupled to the seat bottom. The armrest assembly includes a base armrest portion and a side armrest portion movable from a stowed configuration to an extended configuration relative to the base armrest portion. The convertible furniture arrangement is convertible from a first seating mode to a second seating mode. In the first seating mode, the side armrest portion is in the stowed configuration and the back cushion is positioned against the back frame. In the second seating mode, the side armrest portion is in the extended configuration and the back cushion is positioned against the side armrest portion.

In an example thereof, the side armrest portion is pivotable from the stowed configuration to the extended configuration relative to the base armrest portion.

In another example thereof, the back frame includes a first support surface against which the back cushion is positioned in the first seating mode, and the first support surface is disposed at a first angle relative to a vertical axis. The side armrest portion includes a second support surface against which the back cushion is positioned in the second seating mode. The second support surface is disposed at a second angle relative to the vertical axis in the second seating mode, and the second angle is substantially equal to the first angle.

In another example thereof, the base armrest portion includes a third support surface against which the back cushion is positioned in the second seating mode. The third support surface is disposed at a third angle relative to the vertical axis in the second seating mode, and the third angle is substantially equal to the first angle and the second angle.

In another example thereof, the armrest assembly further includes an upper armrest portion movably coupled to the base armrest portion. In the stowed configuration, the upper armrest portion covers the side armrest portion, and in the extended configuration, the upper armrest portion is disposed aside the side armrest portion.

In another example thereof, the upper armrest portion is pivotably coupled to the base armrest portion.

In another example thereof, the seat assembly is a first seat assembly, and the furniture arrangement further includes a second seat assembly. In the first seating mode, the back cushion faces transversely relative to the second seat assembly, and in the second seating mode, the back cushion faces toward the second seat.

In another example thereof, the second seat assembly includes a reconfigurable armrest assembly.

In yet another exemplary embodiment of the present disclosure, a convertible furniture arrangement for a living quarters is provided. The living quarters includes a wall and a floor. The convertible furniture arrangement includes a table assembly having a storage structure, a first table portion pivotably coupled to the storage structure about a first pivot axis, and a second table portion pivotably coupled to the storage structure about a second pivot axis. The first table portion includes a first upper surface, and the second table portion includes a second upper surface. The table assembly is convertible from a table use configuration to a table storage configuration. In the table use configuration, the first upper surface is substantially flush with the second upper surface, and in the table storage configuration, the first table portion is at least partially positioned in the storage structure.

In an example thereof, the first pivot axis and the second pivot axis are substantially parallel.

In another example thereof, the first pivot axis is disposed vertically below the first table portion, and the second pivot axis is vertically aligned with the second table portion.

In another example thereof, the table assembly further includes a lock configured to secure the first table portion in the table storage configuration.

In another example thereof, the lock is a user-actuated lock.

In another example thereof, the user-actuated lock is a sash lock.

In another example thereof, the lock is a first lock, and the furniture arrangement further includes a second lock configured to secure the first table portion in the table storage configuration. The second lock includes a lock bar pivotally coupled to the first table portion.

In another example thereof, the storage structure includes a lock bracket, and the lock bar contacts the lock bracket to secure the first table portion in the table storage configuration.

In another example thereof, the lock is a user-actuated lock, and the furniture arrangement further includes a bed assembly convertible from a bed use configuration to a bed storage configuration and vice versa. The storage structure is fixedly coupled to the bed assembly such that the table assembly moves together with the bed assembly when converting from the bed use configuration to the bed storage configuration and vice versa. The lock bar automatically pivots and contacts the storage structure when converting from the bed storage configuration to the bed use configuration if the user-actuated lock is not actuated.

In another example thereof, the furniture arrangement further includes a bed assembly convertible from a bed use configuration to a bed storage configuration and vice versa. The storage structure is fixedly coupled to the bed assembly such that the table assembly moves together with the bed assembly when converting from the bed use configuration to the bed storage configuration and vice versa.

In another example thereof, the bed assembly pivots from the bed use configuration to the bed storage configuration.

Additional features and advantages will become apparent to those skilled in the art upon consideration of the following detailed description.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
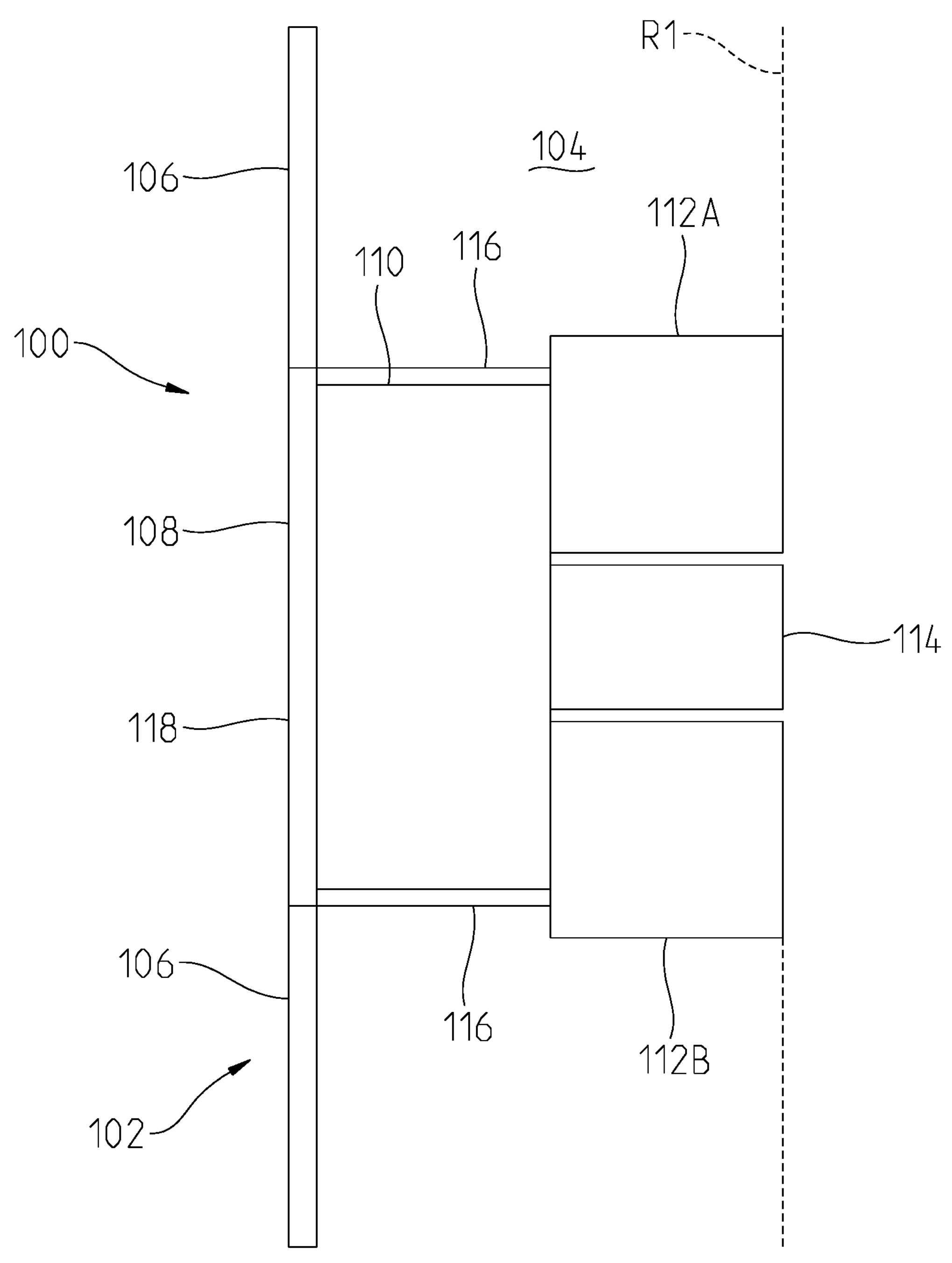
FIG. 1 schematically illustrates an embodiment of a convertible furniture arrangement according to the present disclosure in a retracted configuration.

For the purposes of promoting an understanding of the principles of the present disclosure, reference is now made to the embodiments illustrated in the drawings, which are described below. The embodiments disclosed below are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (for example, the components are "coupled" via at least a third component), but yet still cooperate or interact with each other.

In some instances throughout this disclosure and in the claims, numeric terminology, such as first, second, third, and fourth, is used in reference to various components, inputs, and other items. Such use is not intended to denote an ordering of the components. Rather, numeric terminology is used to assist the reader in identifying the component being referenced and should not be narrowly interpreted as providing a specific order of components.

Figure 2:
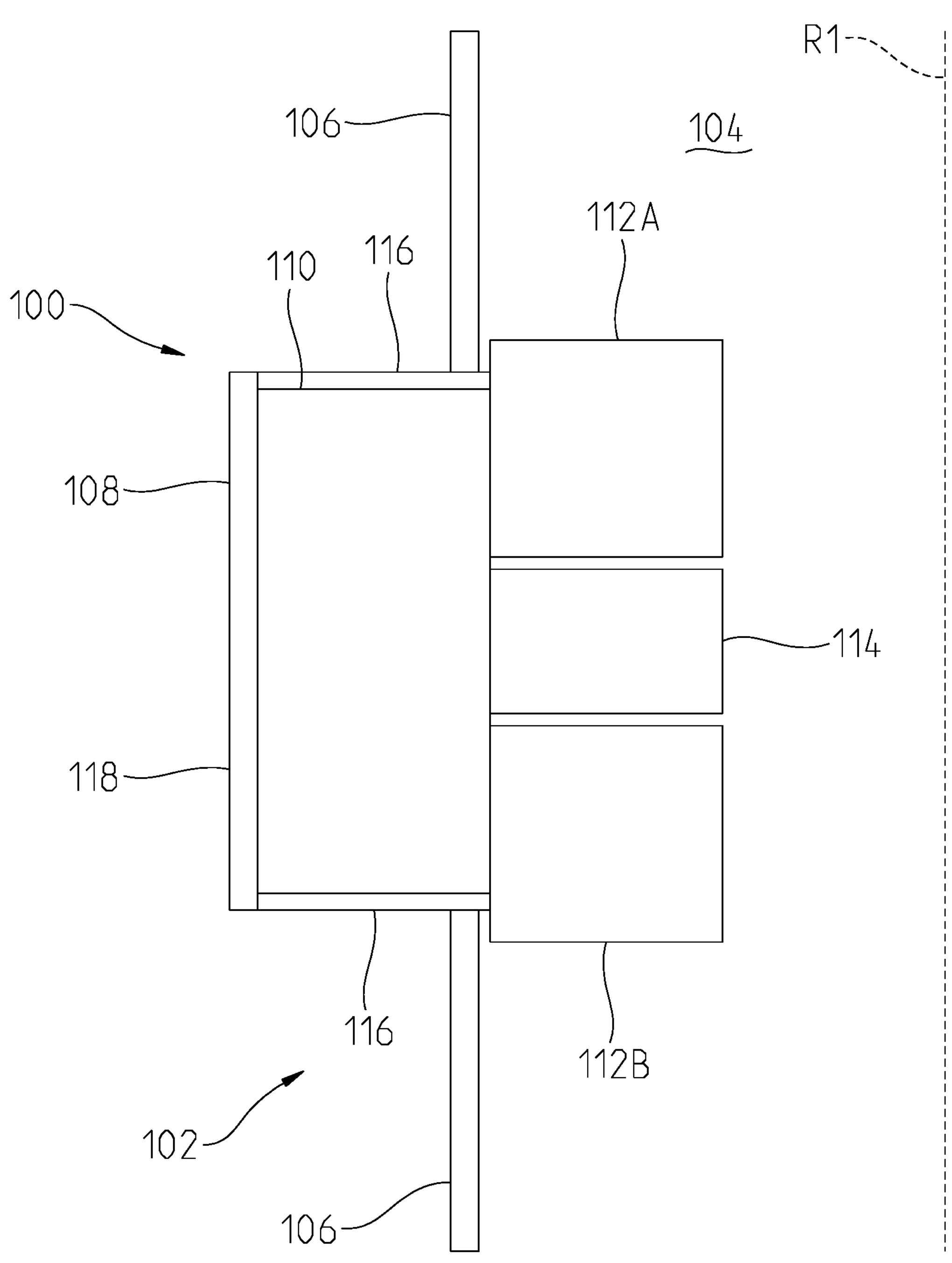
FIG. 2 schematically illustrates the convertible furniture arrangement of FIG. 1 in an extended configuration and a seating mode.
Figure 3:
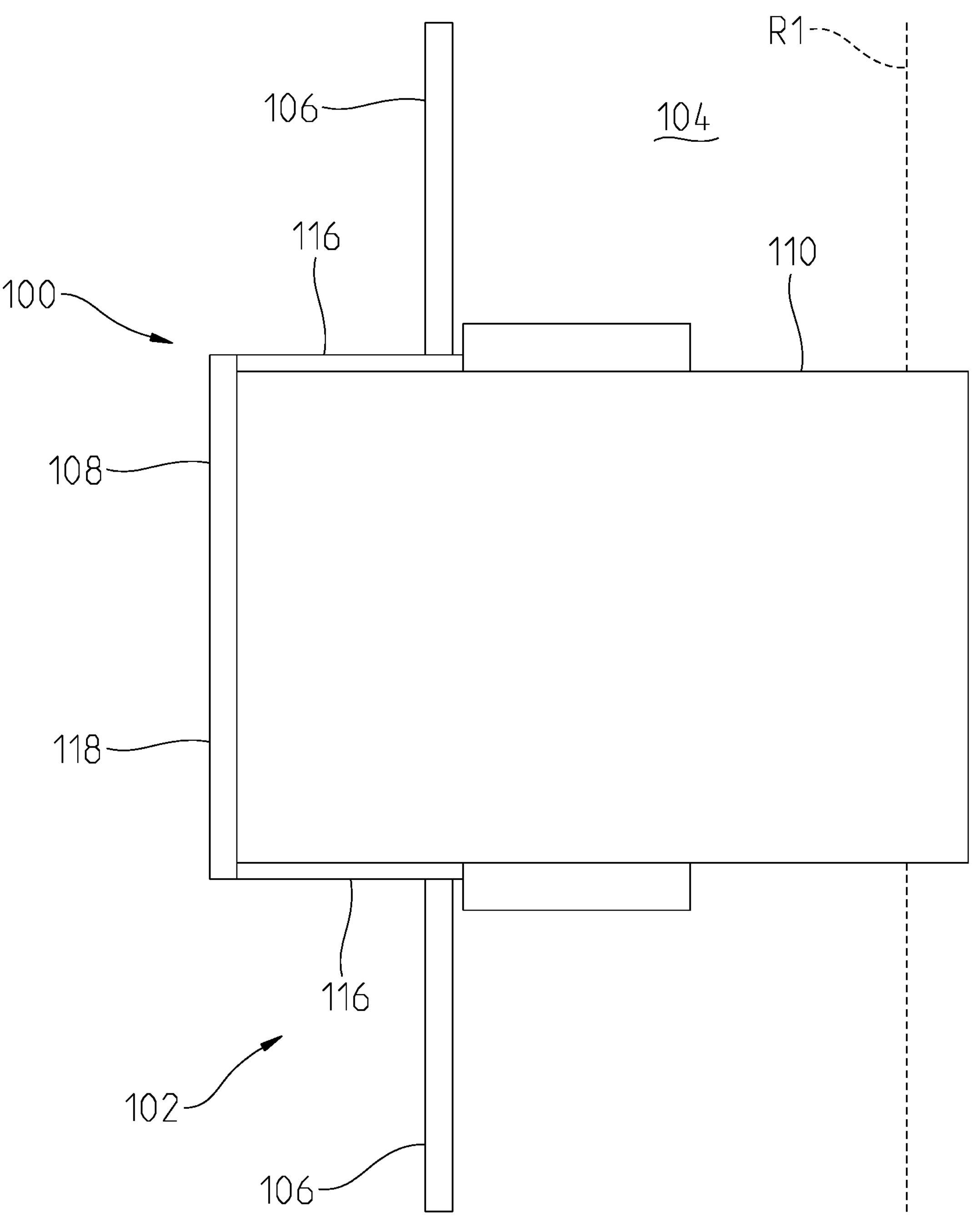
FIG. 3 schematically illustrates the convertible furniture arrangement of FIG. 1 in the extended configuration and a bed mode.

FIGS. 1-3 schematically illustrate an embodiment of a convertible furniture arrangement 100 according to the present disclosure. The convertible furniture arrangement 100 is positioned in a living quarters 102, which may be, for example, a recreational vehicle. The living quarters 102 may include, for example, a floor 104, one or more walls 106, and a ceiling (not shown). In some embodiments and as illustrated, the convertible furniture arrangement 100 includes, or is constructed together with, a slide-out structure or "room" 108 of the living quarters 102. As a result, the convertible furniture arrangement 100 is movable relative to the walls 106 and the floor 104 of the living quarters 102 from a retracted configuration (FIG. 1) to an extended configuration (FIG. 2) and vice versa. The convertible furniture arrangement 100 may occupy the retracted configuration during travel of the living quarters 102. The convertible furniture arrangement 100 may occupy the extended configuration when the living quarters 102 is stationary to increase its volume. The living quarters 102 may include one or more actuators (not shown—for example, electric motors, hydraulic pistons, and the like) for moving the convertible furniture arrangement 100 relative the walls 106 and the floor 104.

The convertible furniture arrangement 100 also includes a bed assembly 110, which may also be referred to as a Murphy bed assembly, a first chair assembly 112A, a second chair assembly 112B, and a table assembly 114 that are carried by the slide-out structure 108. These assemblies are convertible to provide the convertible furniture arrangement 100 with various modes suitable for different activities. For example and referring to FIG. 2, in the extended configuration the convertible furniture arrangement 100 may occupy one or more seating modes. In each seating mode, as the name implies, the first seat assembly 112A and the second seat assembly 112B may each support one or more occupants in seated postures. In each seating mode, the bed assembly 110 is stored behind the seat assemblies 112A, 112B and within the slide-out structure 108. As another example and referring to FIG. 3, in the extended configuration the convertible furniture arrangement 100 may occupy a bed mode. In the bed mode, the bed assembly 110 is disposed above the first seat assembly 112A, the second seat assembly 112B, and the table assembly 114 and may support one or more occupants in laying postures.

Illustratively, the slide-out structure 108 includes an open box-like shape. More specifically, the slide-out structure 108 includes side walls 116, a rear wall 118, a floor (shown elsewhere), and a ceiling (shown elsewhere). In other embodiments, the slide-out structure 108 may have other shapes.

With general reference again to FIGS. 1-3, the convertible furniture arrangement 100 is convertible between a relatively compact size and a relatively large size. More specifically, in some embodiments and as illustrated in FIG. 1, in the retracted configuration the convertible furniture arrangement 100 has a first depth. Stated another way, the convertible furniture arrangement 100 extends from the walls 106 of the living quarters 102 to a reference line R1 disposed apart from the walls 106. As illustrated in FIG. 3, in the extended configuration and the bed mode the convertible furniture arrangement 100 has a second, larger depth. Stated another way, in the extended configuration and the bed mode the convertible furniture arrangement 100 extends beyond both the walls 106 of the living quarters 102 and the reference line R1.

FIGS. 4-18 further illustrate the convertible furniture arrangement 100 disposed in, and being converted to, various modes. In FIGS. 4-18, the living quarters 102 is omitted so that features of the convertible furniture arrangement 100 are visible. However, it is understood that the convertible furniture arrangement 100, as illustrated in FIGS. 4-18, could be in the extended configuration or the retracted configuration relative to the living quarters 102. Illustratively, the bed assembly 110, the first and second seat assemblies 112A, 112B, and the table assembly 114 are manually manipulatable to convert the convertible furniture arrangement 100 between the various modes.

Figure 4:
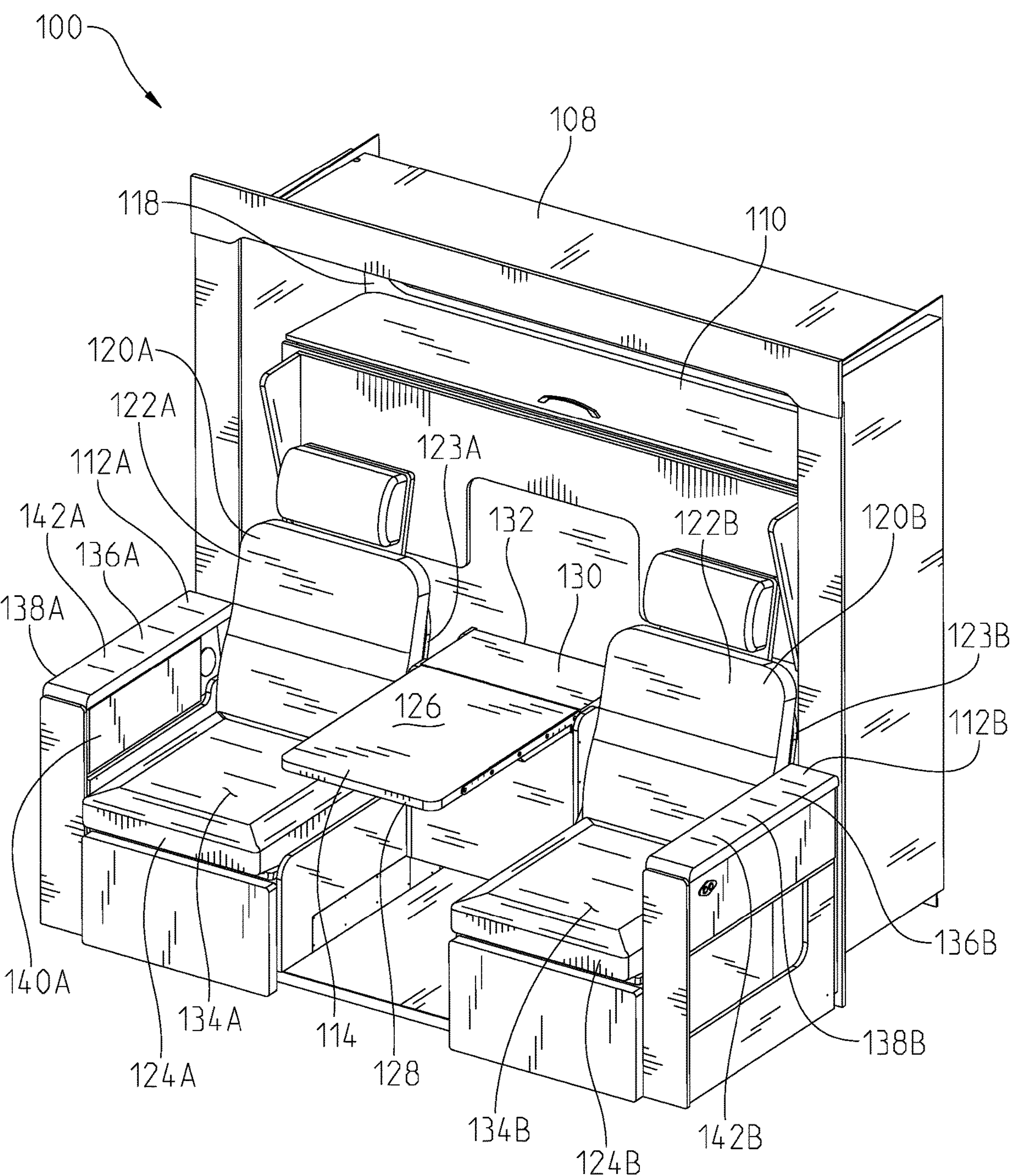
FIG. 4 illustrates a top perspective view of the convertible furniture arrangement of FIG. 1 in a non-reclined seating mode.

FIG. 4 illustrates the convertible furniture arrangement 100 in a seating mode. More specifically, FIG. 4 illustrates the convertible furniture arrangement 100 in a mode in which the first seat assembly 112A and the second seat assembly 112B are not reclined. Stated another way, FIG. 4 specifically illustrates the convertible furniture arrangement 100 in a non-reclined seating mode.

In the non-reclined seating mode, the first seat assembly 112A, the second seat assembly 112B, the bed assembly 110, and the table assembly 114 may be disposed as follows. The bed assembly 110 is disposed apart from the first seat assembly 112A and the second seat assembly 112B. More specifically, the bed assembly 110 is folded and disposed between the seat assemblies 112A, 112B and the rear wall 118 of the slide-out structure 108. Even more specifically, the bed assembly 110 is folded and stowed within the slide-out structure 108.

In the non-reclined seating mode, a first back cushion 120A of a first seat back 122A of the first seat assembly 112A is disposed against a first back frame 123A of the first seat back 122A and on top of a first seat bottom 124A of the first seat assembly 112A. Similarly, a second back cushion 120B of a second seat back 122B of the second seat assembly 112B is disposed against a second back frame 123B of the second seat back 122B and on top of a second seat bottom 124B of the second seat assembly 112B. Due to the positioning of the first back cushion 120A and the second back cushion 120B, occupants seated on the seat bottoms 124A, 124B may face away from the bed assembly 110. As such, the non-reclined seating mode illustrated in FIG. 4 may more specifically be referred to as a forward-facing non-reclined seating mode.

In the non-reclined seating mode, the table assembly 114 is disposed in a table use configuration. More specifically, a first upper surface 126 of a first, or front, table portion 128 of the table assembly 114 is substantially flush with a second upper surface 130 of a second, or rear, table portion 132 of the table assembly 114. In addition, the first upper surface 126 and the second upper surface 130 are disposed above a seating surface 134A of the first seat bottom 124A and a seating surface 1346 of the second seat bottom 124B.

With continued reference to FIG. 4, in the non-reclined seating mode a first armrest assembly 136A of the first seat assembly 112A is disposed in a stowed configuration. More specifically, a first upper armrest portion 138A of the first armrest assembly 136A covers a first side armrest portion 140A of the first armrest assembly 136A. In addition, a first upper armrest surface 142A of the first upper armrest portion 138A is disposed substantially horizontally and configured to support an arm of an occupant seated on the seat bottom 124A. Similarly, a second upper armrest portion 138B of the second armrest assembly 136B covers a second side armrest portion (not shown) of the second armrest assembly 136B. In addition, a second upper armrest surface 142B of the second upper armrest portion 138B is disposed substantially horizontally and configured to support an arm of an occupant seated on the seat bottom 124B.

Figure 5:
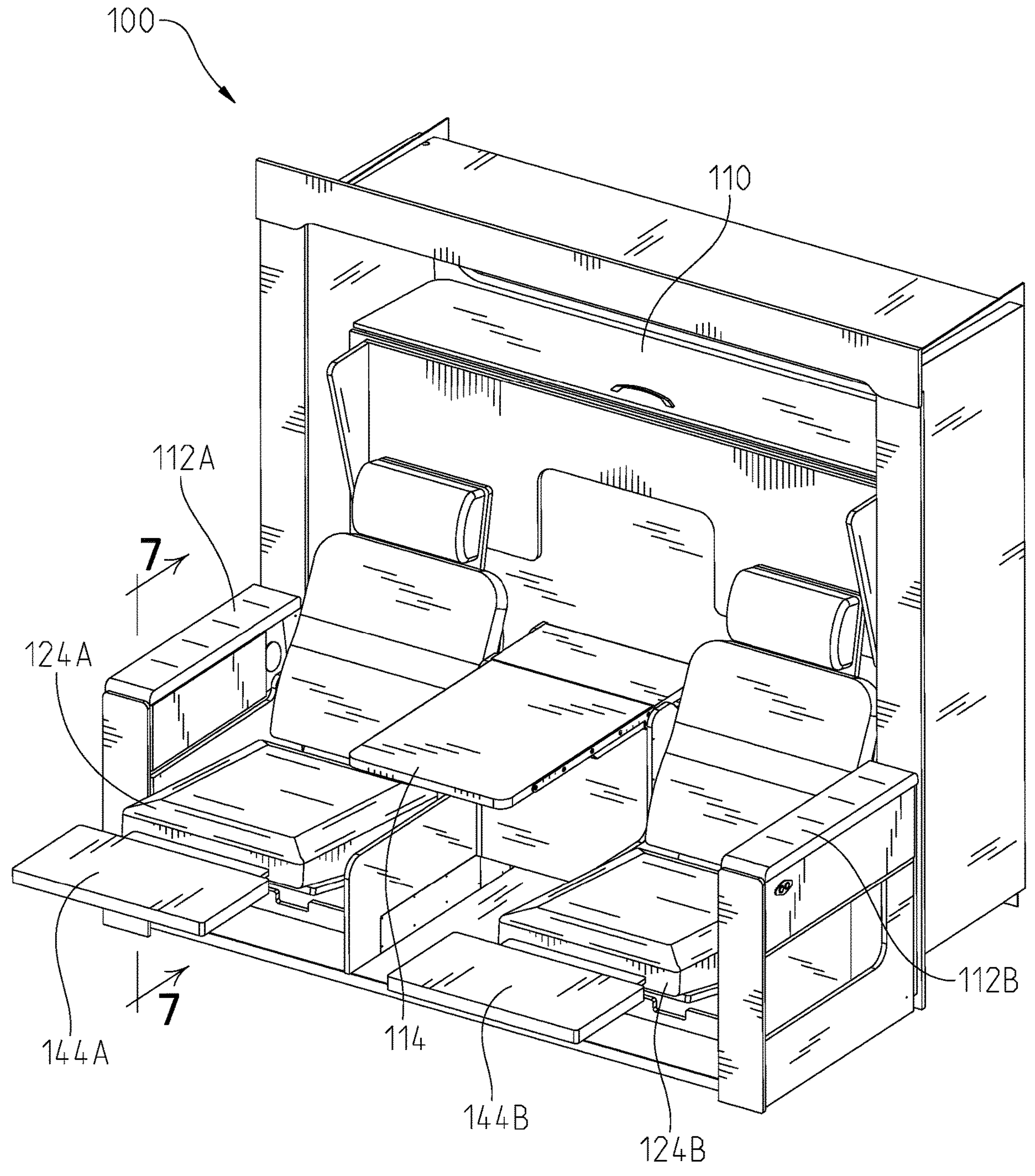
FIG. 5 illustrates a top perspective view of the convertible furniture arrangement of FIG. 1 in a reclined seating mode.

FIG. 5 illustrates the convertible furniture arrangement 100 in another forward-facing seating mode. More specifically, FIG. 5 illustrates the convertible furniture arrangement 100 in a mode in which the first seat assembly 112A and the second seat assembly 1126 are reclined. Stated another way, FIG. 5 specifically illustrates the convertible furniture arrangement 100 in a reclined seating mode.

In the reclined seating mode, the first seat assembly 112A, the second seat assembly 112B, the bed assembly 110, and the table assembly 114 may generally be disposed as described above in connection with the non-reclined seating mode illustrated in FIG. 4. In the reclined seating mode, however, a first footrest 144A of the first seat assembly 112A is elevated relative to the first seat bottom 124A. Similarly, a second footrest 144B of the second seat assembly 112B is elevated relative to the second seat bottom 124B. Recliners (not shown) movably coupling the first footrest 144A and the second footrest 144B to the first seat bottom 124A and the second seat bottom 124B, respectively, may take any form known in the art.

Figure 6:
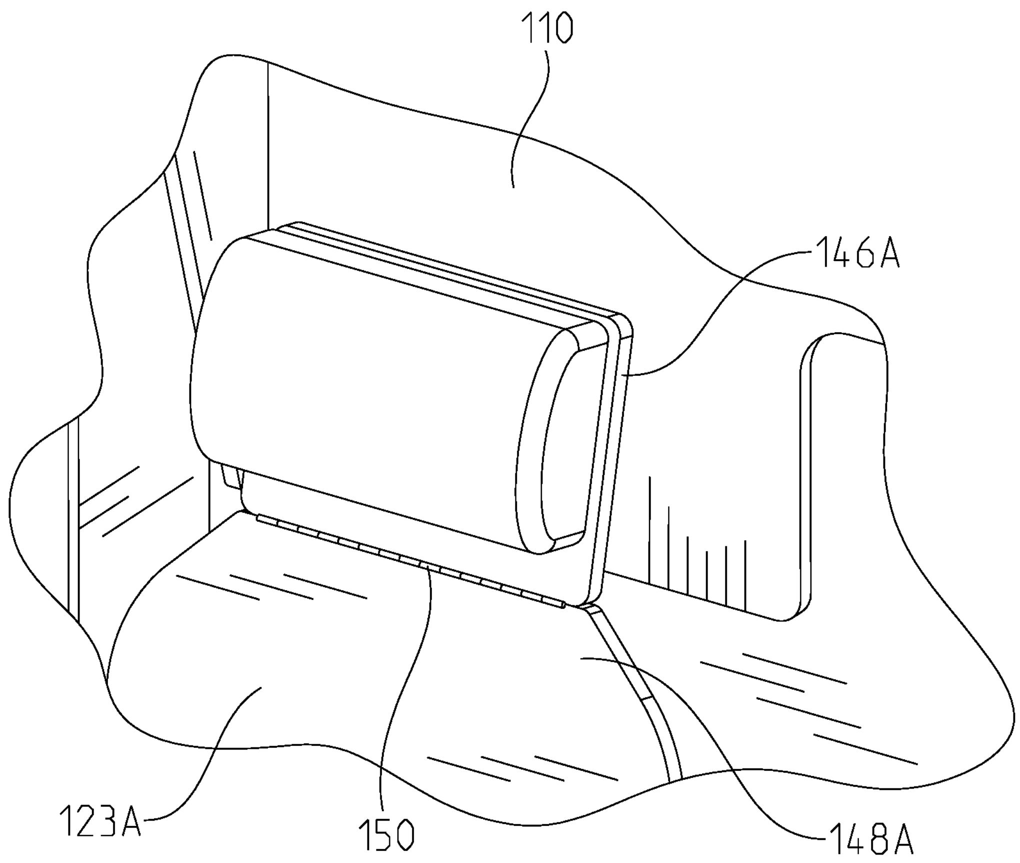
FIG. 6 illustrates a detail top perspective view of a headrest portion of the convertible furniture arrangement of FIG. 1.

With reference to FIG. 6, a first headrest portion 146A and a first torso portion 148A of the first back frame 123A are illustrated. In the non-reclined seating mode (that is, as shown in FIG. 4), the first torso portion 148A is disposed at a first, relatively-upright angle relative to a vertical axis, and in the reclined seating mode (that is, as shown in FIG. 5), the first torso portion 148A is disposed at a second, relatively-inclined angle relative to the vertical axis. The headrest portion 146A pivotably couples to the first torso portion 148A (for example, via a headrest hinge 150) and contacts the bed assembly 110. As a result, the first headrest portion 146A is disposed at a common angle (for example, the first angle) relative to the vertical axis in both the non-reclined seating mode and the reclined seating mode. The second back frame 123B, although not specifically illustrated, may include similar components to the first back frame 123A and be arranged in similar configurations as the first back frame 123A.

Figure 7:
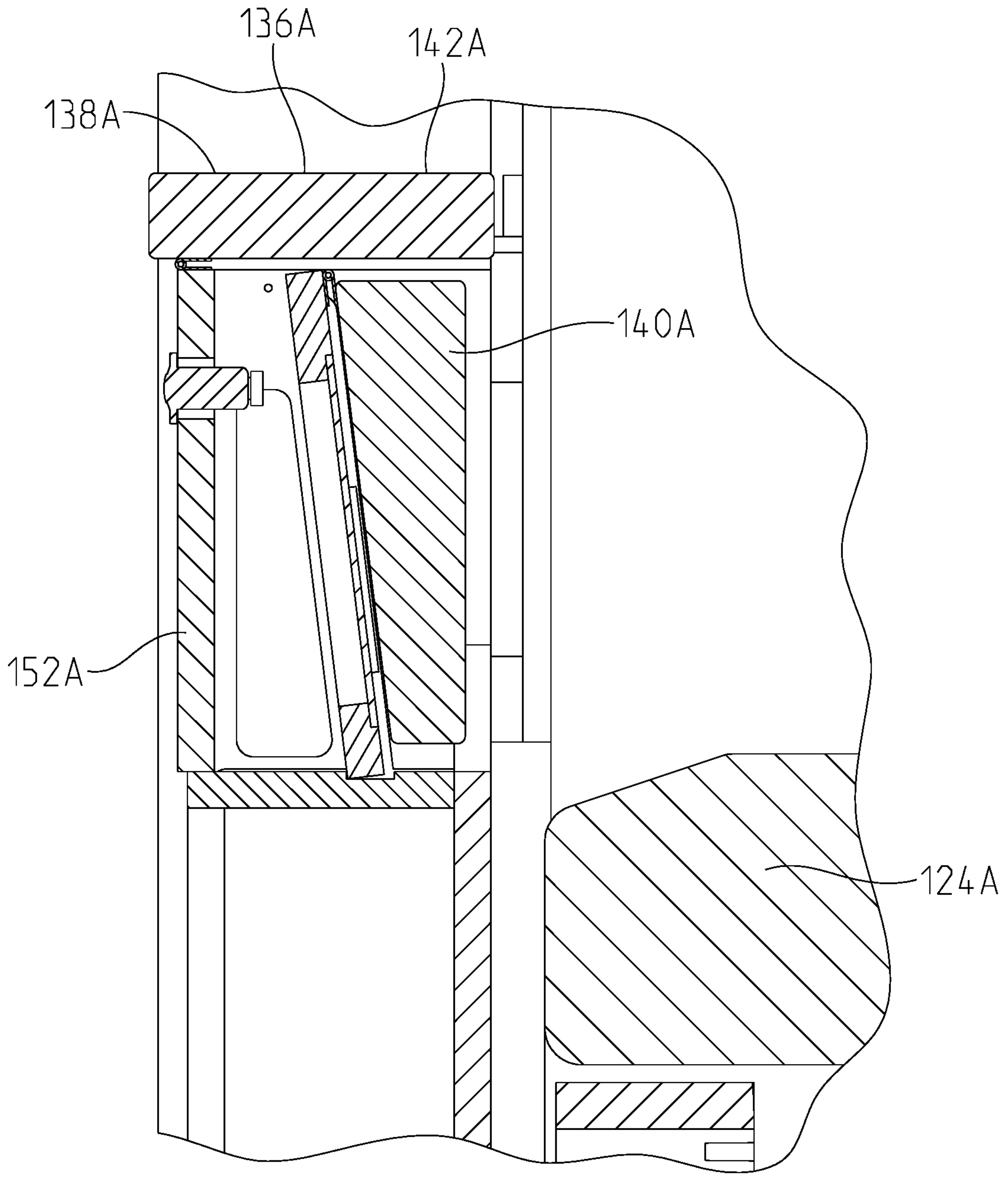
FIG. 7 illustrates a sectional view of an armrest assembly of the convertible furniture arrangement along line 7-7 of FIG. 5 and in a stowed configuration.

FIG. 7 illustrates a sectional view of the first armrest assembly 136A in the stowed configuration (for example, when the convertible furniture arrangement 100 is arranged in the non-reclined seating mode of FIG. 4). As described briefly above, in the stowed configuration the first upper armrest portion 138A covers the first side armrest portion 140A, and the first upper armrest surface 142A is disposed substantially horizontally and configured to support an arm of an occupant seated on the seat bottom 124A. Additionally, the first upper armrest portion 138A also covers a first base armrest portion 152A of the first armrest assembly 136A. The second armrest assembly 136B, although not specifically illustrated, may include similar components to the first armrest assembly 136A.

Figure 8:
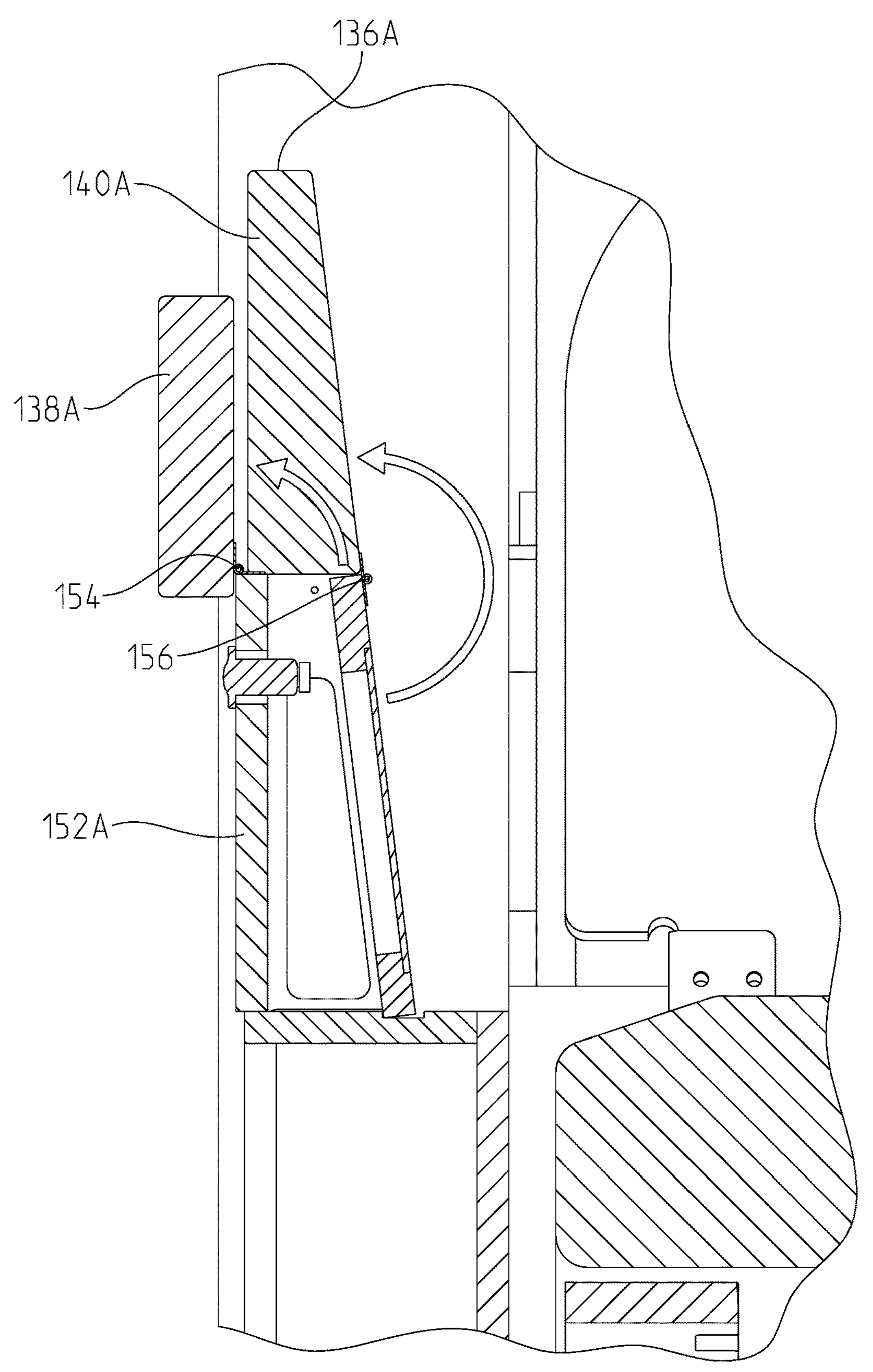
FIG. 8 illustrates another sectional view of the armrest assembly along line 7-7 of FIG. 4 and being converted to an extended configuration.

FIG. 8 illustrates another section view of the first armrest assembly 136A and steps for converting the first armrest assembly 136A from the stowed configuration to an extended configuration. More specifically, the first upper armrest portion 138A is first pivoted relative to the first base armrest portion 152A (for example, via a first armrest hinge 154, by substantially 90 degrees—as used herein, "substantially X degrees" meaning X degrees±5 degrees), and the first side armrest portion 140A is then pivoted relative to the first base armrest portion 152A (for example, via a second armrest hinge 156, by substantially 180 degrees). As a result, in the extended configuration the first side armrest portion 140A is disposed generally aside the first upper armrest portion 138A and generally above the first base armrest portion 152A. The second armrest assembly 136B, although not specifically illustrated, may be reconfigured from the stowed configuration to the extended configuration in similar manner as the first armrest assembly 136A.

Figure 9:
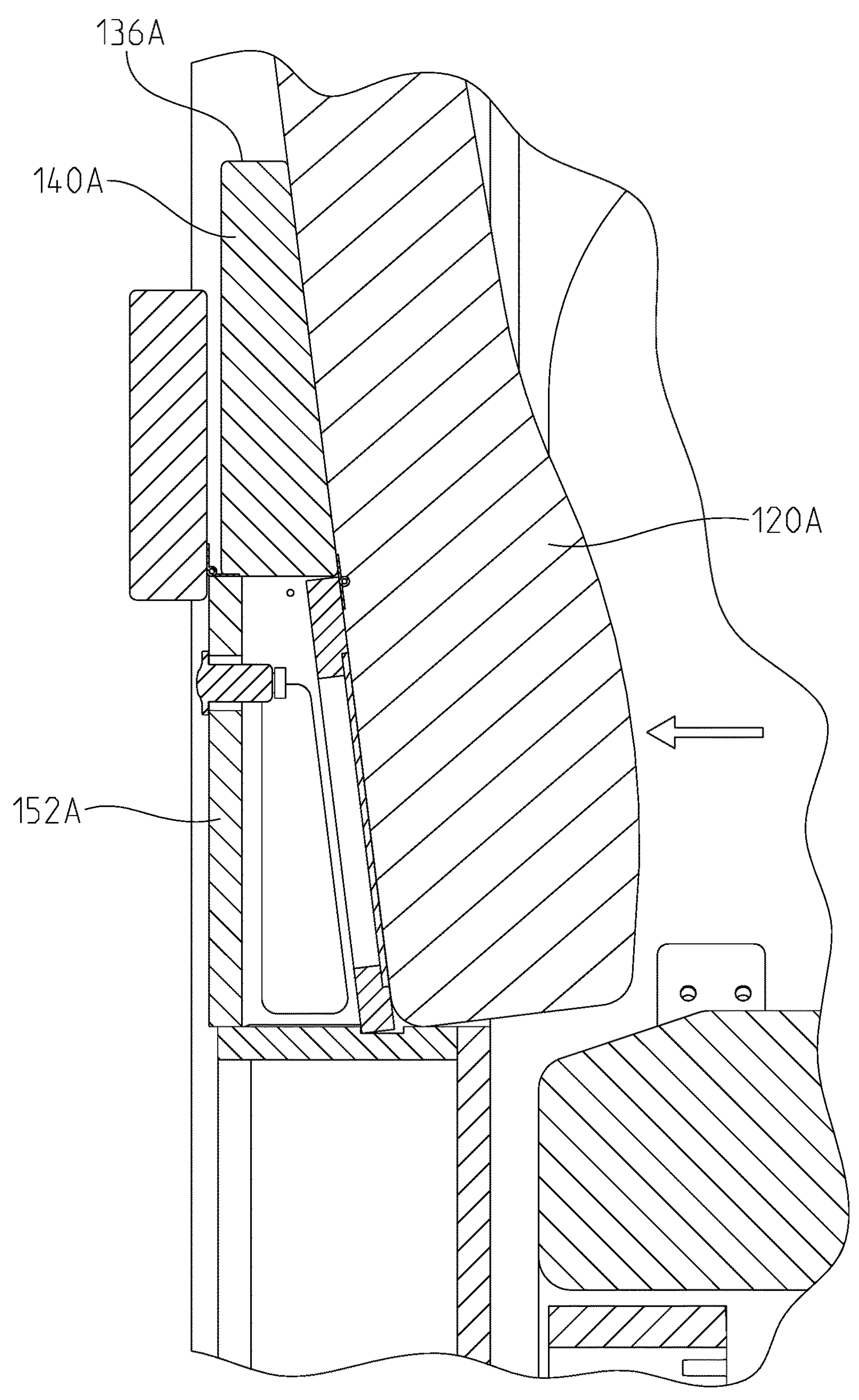
FIG. 9 illustrates another sectional view of the armrest assembly along line 7-7 of FIG. 4 and with a back cushion being positioned against the armrest assembly.
Figure 10:
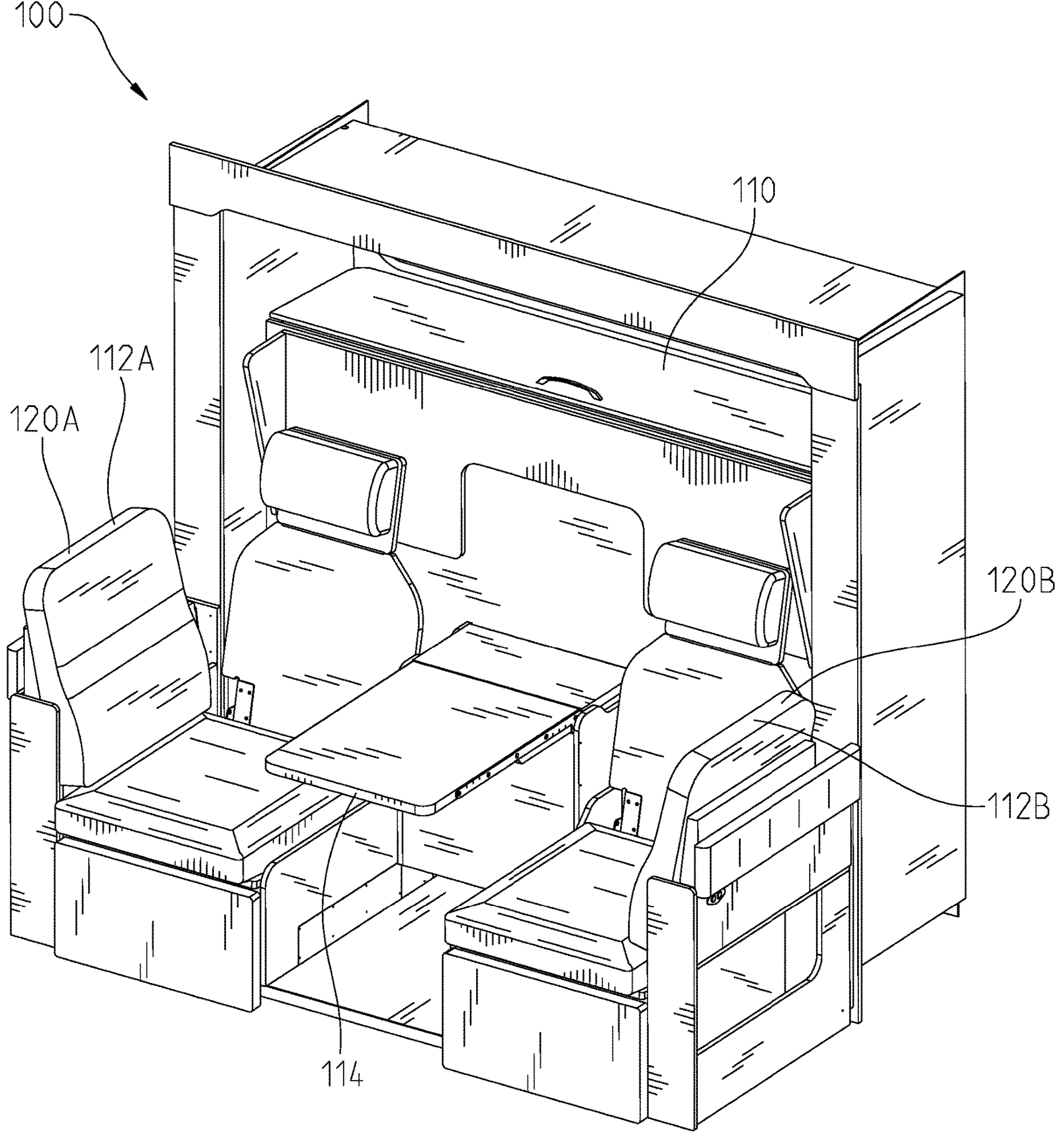
FIG. 10 illustrates a top perspective view of the convertible furniture arrangement of FIG. 1 in a dinette mode.
Figures 11, 12:
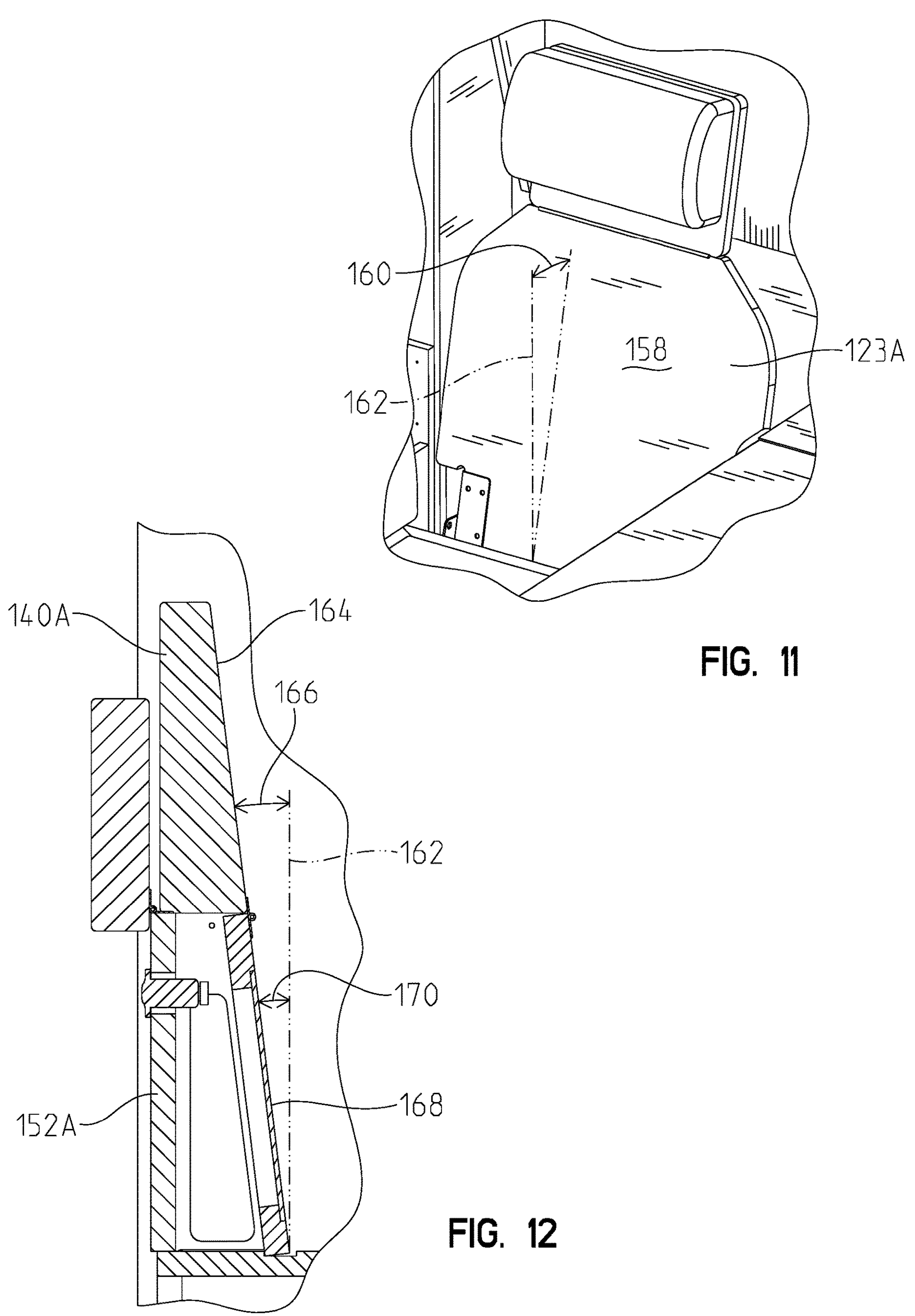
FIG. 11 illustrates a top perspective view of a back frame of the convertible furniture arrangement of FIG. 1.
FIG. 12 illustrates another sectional view of the armrest assembly along line 7-7 of FIG. 4 and the back cushion of FIG. 9.

FIG. 9 illustrates yet another section view of the first armrest assembly 136A in the extended configuration. Additionally, FIG. 9 illustrates the first back cushion 120A being repositioned and placed against the first armrest assembly 136A, specifically the first side armrest portion 140A and the first base armrest portion 152A. The second back cushion 120B, although not specifically illustrated, may be repositioned and placed against the second armrest assembly 136B (shown elsewhere) in similar manner. With additional reference to FIG. 10, the convertible furniture arrangement 100 is thereby configured in a transverse-facing seating mode, more specifically a dinette or dining mode in which occupants of the first seat assembly 112A and the second seat assembly 112B face toward the table assembly 114 and each other. In the dinette mode, the first seat assembly 112A, the second seat assembly 112B, the bed assembly 110, and the table assembly 114 are otherwise disposed as described above in connection with the non-reclined seating mode illustrated in FIG. 4.

In both the non-reclined seating mode and the dinette mode the first back cushion 120A and the second back cushion 120B may be disposed at similar or the same angles relative to a vertical axis. More specifically and referring to FIG. 11, the first back frame 123A comprises a first support surface 158 against which the first back cushion 120A (shown elsewhere) is positioned in the non-reclined seating mode. The first support surface 158 is disposed at a first angle 160 relative to the vertical axis 162. In addition and referring to FIG. 12, the first side armrest portion 140A includes a second support surface 164 against which the first back cushion 120A is positioned in the extended configuration and the dinette mode. The second support surface 164 is disposed at a second angle 166 relative to the vertical axis 162 in the extended configuration and the dinette mode, and the second angle 166 is substantially equal to the first angle 160 (as used herein, "substantially equal" meaning equal within 5 percent of the average of the associated values). Additionally, the first base armrest portion 152A comprises a third support surface 168 against which the first back cushion 120A is positioned in the extended configuration and the dinette mode. The third support surface 168 is disposed at a third angle 170 relative to the vertical axis 162 in the extended configuration and the dinette mode. The third angle 170 is substantially equal to the first angle 160 and the second angle 166. The second back frame 123B and the second armrest assembly 136B, although not specifically illustrated, may be disposed at similar angles to the first back frame 123A and the first armrest assembly 136A, respectively.

Figure 13:
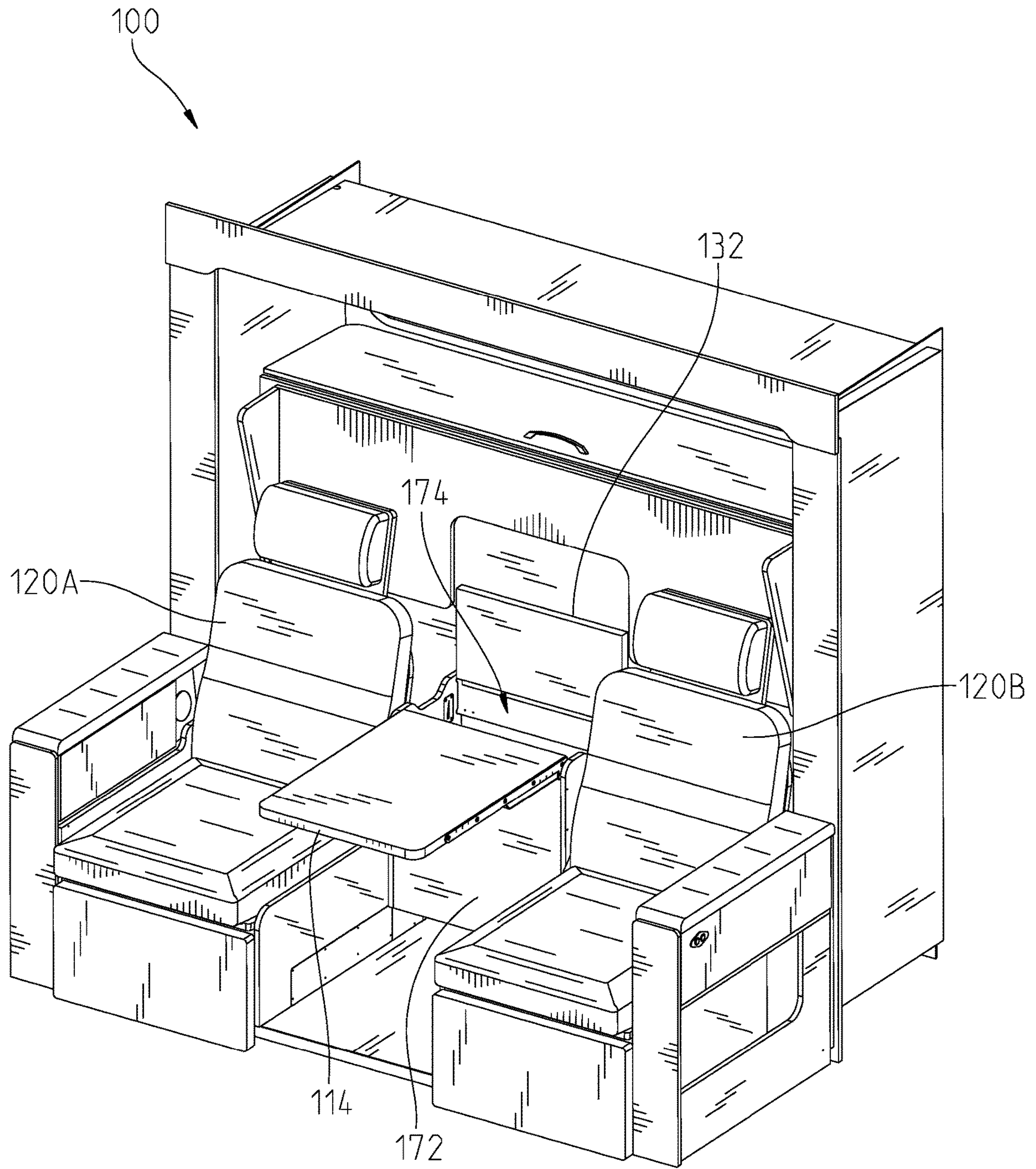
FIG. 13 illustrates a top perspective view of the convertible furniture arrangement of FIG. 1 with a table assembly thereof in a first table storage configuration.

FIG. 13 illustrates the table assembly 114 of the convertible furniture arrangement 100 in a first table storage configuration. More specifically, the rear table portion 132 is pivoted upwardly relative to a storage structure 172 of the table assembly 114, and which permits access to an interior compartment 174 of the storage structure 172. As a result, various items, such as the back cushions 120A and 120B, pillows (not shown), or the like, may be positioned in the interior compartment 174 for storage. The table assembly 114 may then be returned to the table use configuration; that is, the rear table portion 132 may be pivoted downwardly to obscure the interior compartment 174. Although FIG. 13 illustrates the convertible furniture arrangement 100 in the non-reclined seating mode, the table assembly 114 may be configured to the first table storage configuration in other modes, such as the reclined seating mode or the dinette mode.

Figure 18:
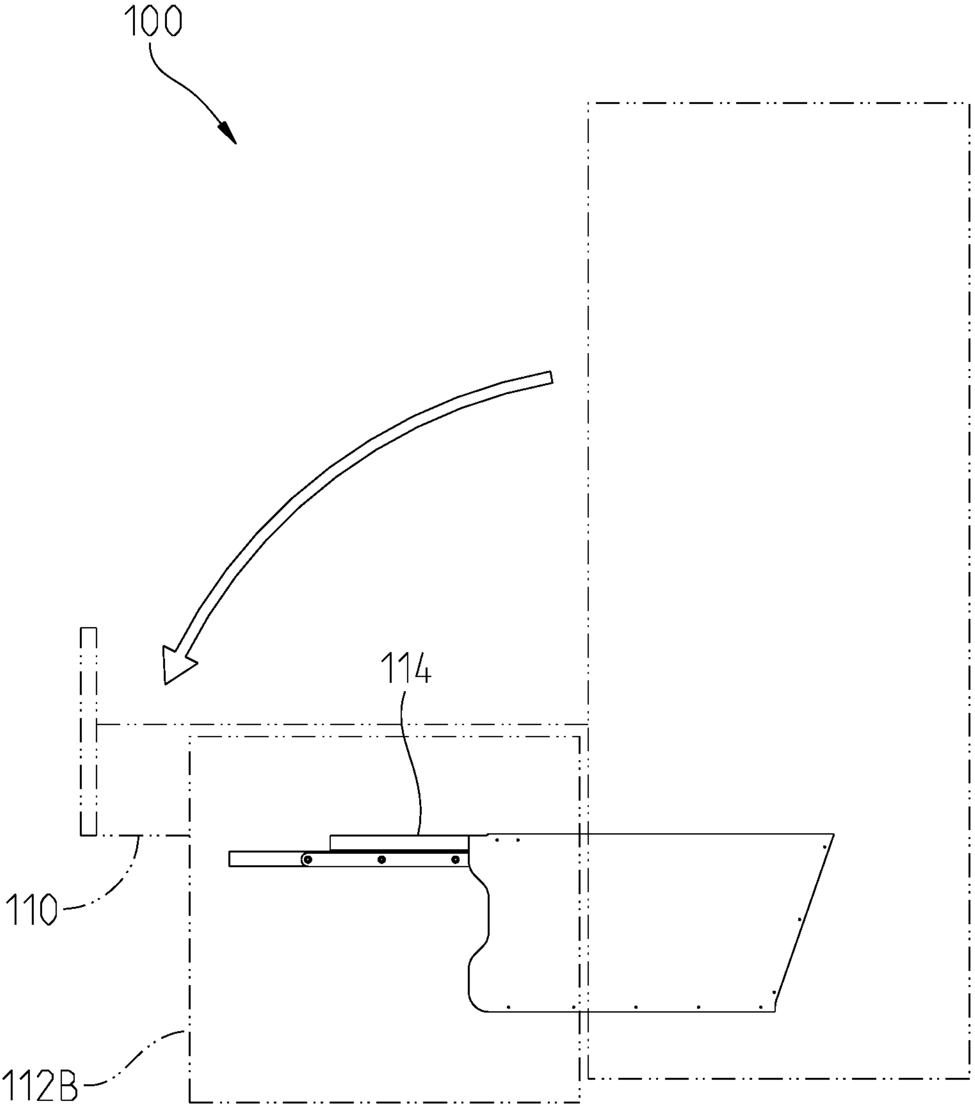
FIG. 18 schematically illustrates a side view of a step for reconfiguring the convertible furniture arrangement of FIG. 1 to a bed mode.

FIGS. 14-17 illustrate actions for reconfiguring the table assembly 114 to a second table storage configuration prior to converting the furniture arrangement 100 from the non-reclined seating mode to the bed mode, and FIG. 18 illustrates actions for converting the furniture arrangement 100 to the bed mode.

Figure 14:
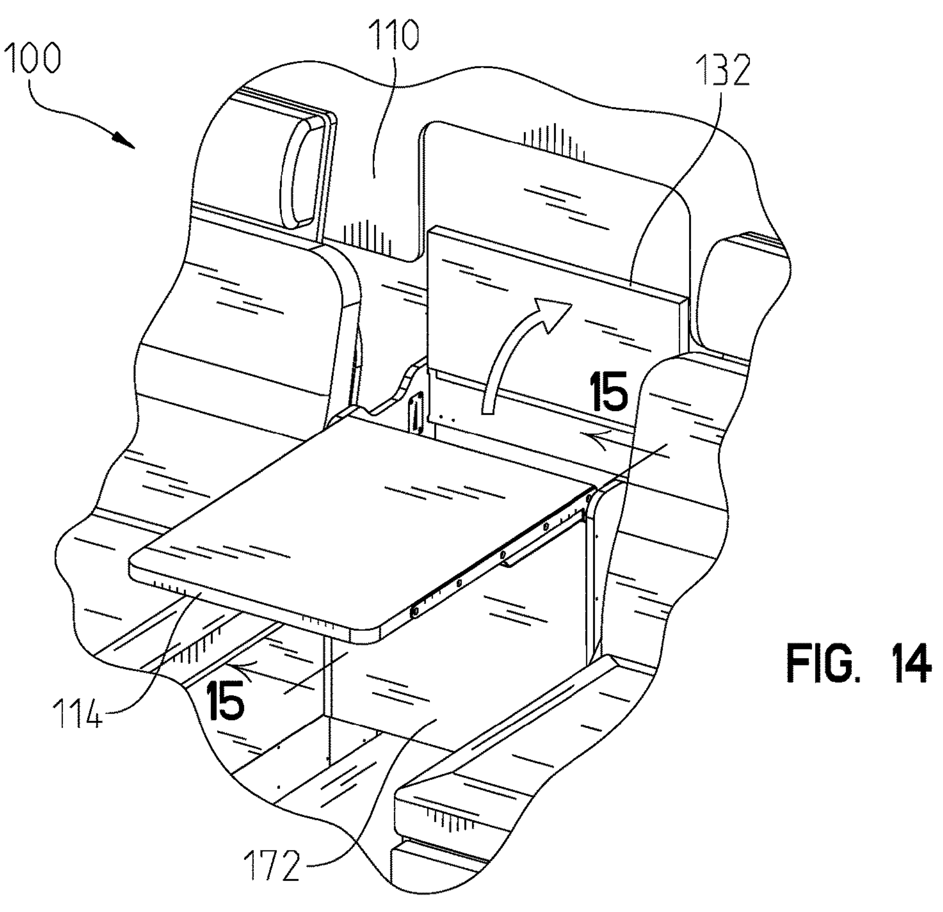
FIG. 14 illustrates a top perspective view of a first step for reconfiguring the table assembly of FIG. 13 to a second table storage configuration.
Figure 15:
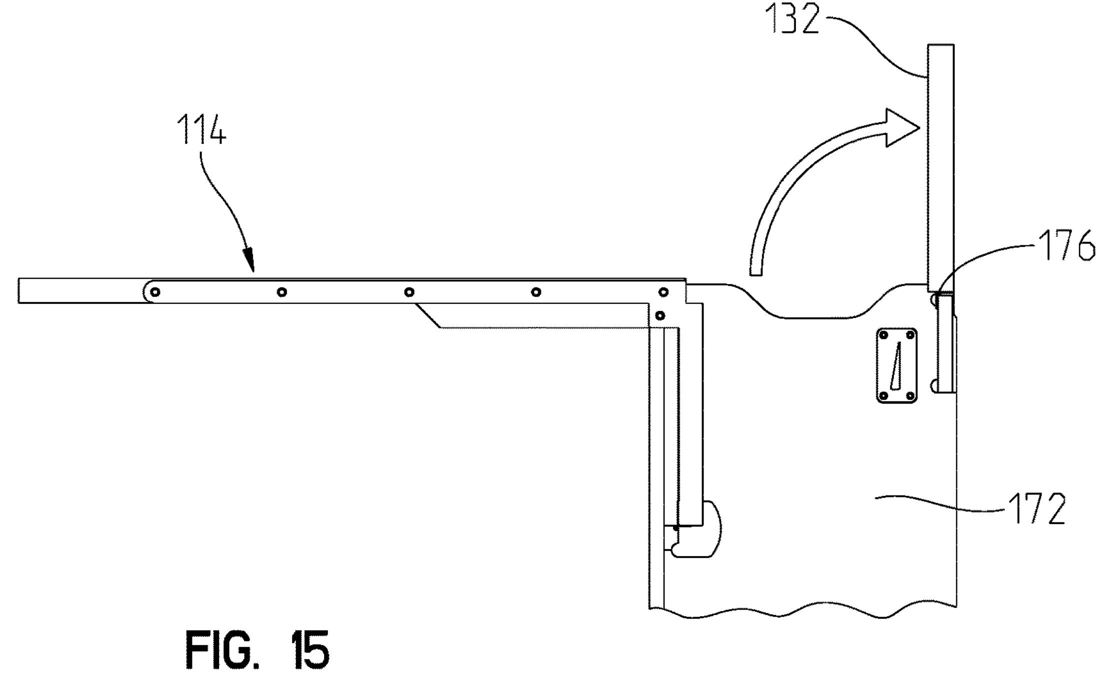
FIG. 15 illustrates a sectional view of the table assembly along line 15-15 of FIG. 14.

FIGS. 14 and 15 illustrate a first step for reconfiguring the table assembly 114 to the second table storage configuration. More specifically, these views illustrate the rear table portion 132 being pivoted upwardly relative to the storage structure 172 of the table assembly 114. The rear table portion 132 pivots relative to the storage structure 172 about a rear pivot axis (defined, for example, by a rear table hinge 176—FIG. 15). Illustratively, the rear pivot axis is disposed near the bed assembly 110 and is vertically aligned with the rear table portion 132.

Figures 16, 17:
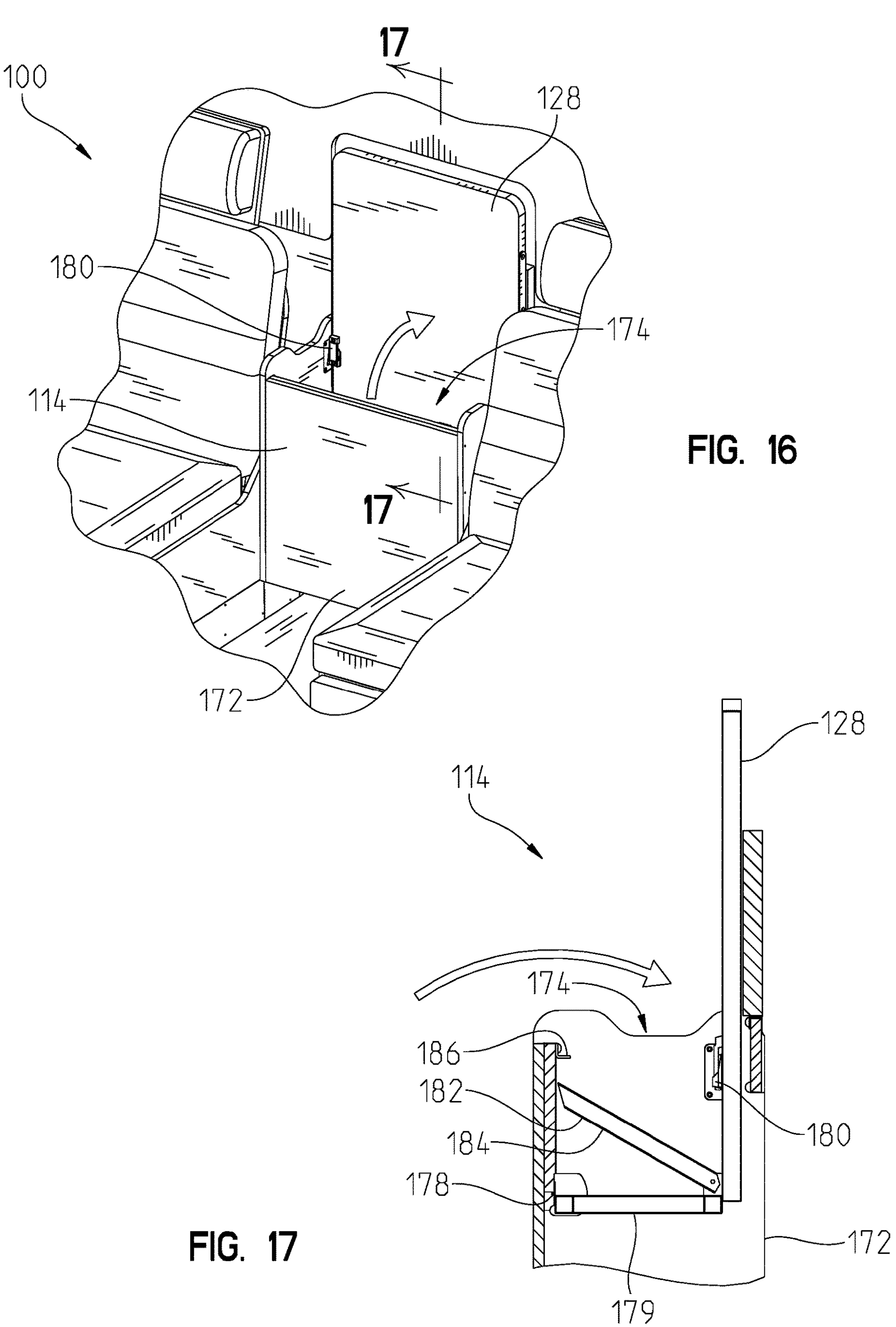
FIG. 16 illustrates a top perspective view of a second step for reconfiguring the table assembly of FIG. 13 to the second table storage configuration.
FIG. 17 illustrates a sectional view of the table assembly along line 17-17 of FIG. 16.

FIGS. 16 and 17 illustrates a second step for reconfiguring the table assembly 114 to the second table storage configuration. More specifically, these views illustrate the front table portion 128 being pivoted relative to the storage structure 172 and partially into the interior compartment 174 thereof. The front table portion 128 pivots relative to the storage structure 172 about a front pivot axis (defined, for example, by a front table hinge 178 coupled to the front table portion 128 via a pivotable bracket 179—FIG. 17). Illustratively, the front pivot axis is disposed vertically below the front table portion 128 (in the table use configuration) and the rear pivot axis. Illustratively, the front pivot axis and the rear pivot axis are substantially parallel (as used herein, "substantially parallel" meaning parallel±5 degrees).

With continued reference to FIGS. 16 and 17, the table assembly 114 includes a first lock 180 for securing the front table portion 128 in the second table storage configuration.

The first lock 180 may be, for example, a user-actuated lock, more specifically a sash lock. Referring specifically to FIG. 17, the table assembly 114 also includes a second or auxiliary lock 182 for securing the front table portion 128 in the second table storage configuration. The second lock 182 may include, for example, a lock bar 184 pivotally coupled to the front table portion 128. The lock bar 184 contacts a lock bracket 186 of the storage structure 172 to secure the first table portion 128 in the second table storage configuration. More specifically, the storage structure 172 is fixedly coupled to the bed assembly 110 such that the table assembly 114 moves together with the bed assembly 110 when reconfiguring from a bed use configuration (that is, the position of the bed assembly 110 in any of the seating modes) to a bed storage configuration (that is, the position of the bed assembly 110 in the bed mode) and vice versa, and the lock bar 184 automatically pivots and contacts the lock bracket 186 when reconfiguring the bed assembly 110 from the bed storage configuration to the bed use configuration if the first lock 180 is not actuated.

FIG. 18 illustrates a step for reconfiguring the convertible furniture arrangement 100 to the bed mode. More specifically, the bed assembly 110 and the table assembly 114, in the second table storage configuration, are pivoted downwardly and between the first seat assembly 112A (shown elsewhere) and the second seat assembly 112B. The bed assembly 110 and mechanisms for reconfiguring the bed assembly 110 from the bed use configuration to the bed storage configuration may take any form known in the art. As a specific example, the bed assembly 110 and associated mechanisms may be as described in U.S. application Ser. No. 17/372,804, titled CONVERTIBLE FURNITURE ARRANGEMENT FOR A RECREATIONAL VEHICLE, filed on Jul. 12, 2021, the disclosure of which is hereby incorporated by reference.

Convertible furniture arrangements according to the present disclosure may take different forms and/or include different components than those described above and shown in the drawings. For example, convertible furniture arrangements according to the present disclosure may include different table assemblies, such as an assembly in which a telescoping pedestal supports a table surface, or any other form known in the art.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A convertible furniture arrangement for a living quarters comprising a wall and a floor, the convertible furniture arrangement comprising:

a seat assembly comprising:
- a seat bottom;
- a seat back coupled to the seat bottom, the seat back comprising:
  - a back frame;
  - a back cushion being movable relative to the back frame;
- an armrest assembly coupled to the seat bottom, the armrest assembly comprising:
  - a base armrest portion; and
  - a side armrest portion movable from a stowed configuration to an extended configuration relative to the base armrest portion;

wherein the convertible furniture arrangement is convertible from a first seating mode to a second seating mode, in the first seating mode the side armrest portion being in the stowed configuration and the back cushion being positioned against the back frame, and in the second seating mode the side armrest portion being in the extended configuration and the back cushion being positioned against the side armrest portion;

wherein the side armrest portion is pivotable from the stowed configuration to the extended configuration relative to the base armrest portion;

wherein the back frame comprises a first support surface against which the back cushion is positioned in the first seating mode, the first support surface being disposed at a first angle relative to a vertical axis, the side armrest portion comprises a second support surface against which the back cushion is positioned in the second seating mode, the second support surface being disposed at a second angle relative to the vertical axis in the second seating mode, and the second angle being substantially equal to the first angle;

wherein the base armrest portion comprises a third support surface against which the back cushion is positioned in the second seating mode, the third support surface being disposed at a third angle relative to the vertical axis in the second seating mode, and the third angle being substantially equal to the first angle and the second angle.

2. A convertible furniture arrangement for a living quarters comprising a wall and a floor, the convertible furniture arrangement comprising:

a seat assembly comprising:
- a seat bottom;
- a seat back coupled to the seat bottom, the seat back comprising:
  - a back frame;
  - a back cushion being movable relative to the back frame;
- an armrest assembly coupled to the seat bottom, the armrest assembly comprising:
  - a base armrest portion; and
  - a side armrest portion movable from a stowed configuration to an extended configuration relative to the base armrest portion;

wherein the convertible furniture arrangement is convertible from a first seating mode to a second seating mode, in the first seating mode the side armrest portion being in the stowed configuration and the back cushion being positioned against the back frame, and in the second seating mode the side armrest portion being in the extended configuration and the back cushion being positioned against the side armrest portion; and wherein the armrest assembly further comprises an upper armrest portion movably coupled to the base armrest portion, in the stowed configuration the upper armrest portion covering the side armrest portion, and in the extended configuration the upper armrest portion being disposed aside the side armrest portion.

3. The convertible furniture arrangement of claim 2, wherein the upper armrest portion is pivotably coupled to the base armrest portion.

4. The convertible furniture arrangement of claim 1, wherein the seat assembly is a first seat assembly, and further comprising a second seat assembly, in the first seating mode the back cushion faces transversely relative to the second seat assembly, and in the second seating mode the back cushion faces toward the second seat.

5. The convertible furniture arrangement of claim 4, wherein the second seat assembly comprises a reconfigurable armrest assembly.

6. The convertible furniture arrangement of claim 1, wherein the seat assembly is a first seat assembly, further comprising a second seat assembly, and wherein a table assembly is disposed between the first seat assembly and the second seat assembly.

7. The convertible furniture arrangement of claim 6, wherein the table assembly is movable relative to the first seat assembly and the second seat assembly.

8. The convertible furniture arrangement of claim 1, wherein the armrest assembly further comprises an upper armrest portion movably coupled to the base armrest portion, in the stowed configuration the upper armrest portion covering the side armrest portion, and in the extended configuration the upper armrest portion being disposed aside the side armrest portion.

9. The convertible furniture arrangement of claim 8, wherein the upper armrest portion is pivotably coupled to the base armrest portion.

10. The convertible furniture arrangement of claim 8, wherein in the extended configuration the side armrest portion is disposed above the upper armrest portion.

11. The convertible furniture arrangement of claim 8, wherein the upper armrest portion is pivotable relative to the base armrest portion by substantially 90 degrees from the stowed configuration to the extended configuration.

12. The convertible furniture arrangement of claim 1, wherein the side armrest portion is pivotable relative to the base armrest portion by substantially 180 degrees from the stowed configuration to the extended configuration.

13. The convertible furniture arrangement of claim 3, wherein the upper armrest portion is pivotable relative to the base armrest portion by substantially 90 degrees from the stowed configuration to the extended configuration.

14. The convertible furniture arrangement of claim 13, wherein the side armrest portion is pivotable relative to the base armrest portion by substantially 180 degrees from the stowed configuration to the extended configuration.

15. The convertible furniture arrangement of claim 2, wherein in the extended configuration the side armrest portion is disposed above the upper armrest portion.

16. A convertible furniture arrangement for a living quarters comprising a wall and a floor, the convertible furniture arrangement comprising:

a seat bottom;

a seat cushion having a first uppermost surface; and an armrest assembly coupled to the seat bottom, the armrest assembly comprising:

a base armrest portion having a second uppermost surface positioned vertically higher than the first uppermost surface; and a side armrest portion pivotable by substantially 180 degrees from a stowed configuration to an extended configuration relative to the base armrest portion, in the stowed configuration the side armrest portion being horizontally nearer to the seat cushion than in the extended configuration;

wherein the convertible furniture arrangement is convertible from a first seating mode to a second seating mode, in the first seating mode the side armrest portion being in the stowed configuration and the base armrest portion and the side armrest portion horizontally overlap, in the second seating mode the side armrest portion being in the extended configuration and the side armrest portion being positioned generally over the base armrest portion.

17. The convertible furniture arrangement of claim 16, wherein in the stowed configuration the base armrest portion and the side armrest portion define a first maximum width in a horizontal direction and in the extended configuration the base armrest portion and the side armrest portion define a second maximum width in the horizontal direction, the second maximum width being less than the first maximum width.

18. The convertible furniture arrangement of claim 16, wherein the armrest assembly further comprises an upper armrest portion rotatably coupled to the base armrest portion, the upper armrest portion having an upper surface covering both the base armrest portion and the side armrest portion when the side armrest portion is in the stowed configuration and the upper surface of the upper armrest portion being positioned completely to a first horizontal side of the base armrest portion and the side armrest portion when the side armrest portion is in the extended configuration.

19. The convertible furniture arrangement of claim 16, further comprising a first seat assembly including the seat bottom, the seat cushion, and the armrest assembly, and further comprising a second seat assembly.

20. The convertible furniture arrangement of claim 19, wherein the second seat assembly comprises a reconfigurable armrest assembly.

21. The convertible furniture arrangement of claim 16, further comprising a first seat assembly including the seat bottom, the seat cushion, and the armrest assembly, and further comprising a second seat assembly, and wherein a table assembly is disposed between the first seat assembly and the second seat assembly.

22. The convertible furniture arrangement of claim 21, wherein the table assembly is movable relative to the first seat assembly and the second seat assembly.

* * * * *